United States Patent [19]

Smith

[11] 3,929,630

[45] Dec. 30, 1975

[54] PROCESS FOR BIOCHEMICAL REACTIONS
[75] Inventor: Pat E. Smith, San Antonio, Tex.
[73] Assignee: Gary Aircraft Corporation, San Antonio, Tex.
[22] Filed: Feb. 22, 1974
[21] Appl. No.: 444,928

Related U.S. Application Data
[63] Continuation-in-part of Ser. No. 285,241, Aug. 31, 1972, abandoned.

[30] Foreign Application Priority Data
Dec. 20, 1971 United Kingdom............... 59038/71

[52] U.S. Cl. .............................................. 210/17
[51] Int. Cl.² .......................................... C02C 1/04
[58] Field of Search ....... 210/17, 36, 150, 151, 506, 210/509; 423/339

[56] References Cited
UNITED STATES PATENTS
2,352,901   7/1944    Klein............................... 210/220 X
2,992,986   7/1961    Ingram................................. 210/17
3,232,434   2/1966    Albersmeyer..................... 210/17 X
3,232,865   2/1966    Quinn et al...................... 210/150 X
3,293,174   12/1966   Robjohns............................ 210/17
3,779,906   12/1973   Levin............................... 210/17 X
3,855,393   12/1974   Rao.................................. 423/339

Primary Examiner—Thomas G. Wyse
Attorney, Agent, or Firm—Fulbright & Jaworski

[57] ABSTRACT

A process for carrying out a biochemical reaction by introducing reactants to the surface of a rigid, porous and absorbent silica foam substrate. Structure of the inorganic foam maintains optimum moisture and environmental conditions required for bacterial growth for biochemical reactions under both aerobic and anerobic conditions. Consequently, the invention provides means for treating water, effluent, sewage as well as for fermenting liquids containing carbohydrates.

4 Claims, No Drawings

PROCESS FOR BIOCHEMICAL REACTIONS

CROSS-REFERENCE TO RELATED APPLICATIONS

This application is a continuation-in-part of my copending application, Ser. No. 285,241, filed Aug. 31, 1972, bearing the same title, now abandoned.

BACKGROUND OF THE INVENTION

The field of art to which the present invention pertains is the provision of a substrate for and the carrying out of biochemical oxidation-reduction reactions. These reactions are generally carried out in a gas/liquid/solid interface under aerobic and/or anaerobic reactions. Typical of reactions of this nature are various water treatment processes, methods for treating industrial waste and liquid effluent, sewage treatment processes and the like.

In this art, applicant is aware of the following U.S. Pat. Nos. 3,293,174; 3,546,111; 2,071,591; 3,235,234; 3,269,542; 3,452,871; 3,347,381; 3,403,095; 3,502,596; 3,402,103; 3,589,518; 3,113,102; 3,232,434; 2,992,986 and 3,232,865.

Conventional processes for treating sewage involve digesting and setting the material to be treated after which it is passed through a gravel bed filter. The filter consists essentially of a bed of crushed rock over a subterranean tiled surface. These filters are widely used due to the fact that their filtration action at high efficiencies removes suspended solids while simultaneously aerating sewage as it trickles through the rock on the tile. The rock surfaces collect a slimy layer rich in a flora of protozoans, bacteria and other microorganisms which consume pathogenic bacteria, remove suspended solids and oxidize dissolved organic matter. This slimy layer is called Zoogleal mass. One of the drawbacks of this type of system is the periodic clogging of the bed by the Zoogleal mass which becomes dislodged from the rock surface, thus giving rise to a continuous and difficult maintenance and revitalization problem. Another drawback of this system is that a continuous flow of water of uniform chemical composition is required or the organisms will die, thereby destroying efficiency of treatment for days or even weeks.

Certain of the prior art patents cited above seek to reduce maintenance and revitalization problems. For example, there are suggestions that filter racks be constructed of higher surface area materials particularly plastics, thermoplastics and wood. However, the performance of these filters has not been satisfactory due to their inability to retain and sustain an adequate Zoogleal layer on the filter surface so as to be continuously effective. The filters are also subject to periodic infestations of the larvae of filter flies (Psychoda) which consume biological films.

Liquid effluent and waste water are commonly treated by passage through aerated percolating or trickling filters so that the water is purified by biologically-active micro-organisms attached to packed beds within the filter. These types of filters have been used in ever-increasing numbers due in large part to governmental regulations to protect the environment. For example, the biological oxygen demand (BOD) of waste water is regulated in order that rivers, streams, lakes and other bodies of water remain capable of sustaining life.

Conventional trickle filters are packed with various media such as, for example, pumice, slag, rock, coke, clinker and the like to which the biologically active-micro-organisms become attached. Air necessary for oxidation passes through interstices in the packing medium, and water or liquid to be treated is "trickled" or otherwise passed downwardly through the bed.

Conventional filter systems have suffered the shortcomings of low throughput, low biological activity and lack of uniform spread of liquid to all parts of the filter medium. In addition, the filter media of conventional systems frequently have failed to offer the biological film a good mechanical and environmental footing where it can grow satisfactorily.

It is well known that coke, slag, clinker and pumice stone provide a higher surface area than smooth rock. This is primarily due to the surface irregularities. Some of these materials are somewhat porous such as volcanic pumice, however, the pore size is uncontrolled and the degree of open pores is low. Volcanic or lava pumice is also of a glassy, non-adsorbent nature.

More recent innovations in trickle and similar type filters are directed to the provision of plastic or organic polymeric filter media in an attempt to increase surface area of the packing media and improve adhesion of microorganisms thereto. Typical of these innovations is that dislcosed in the patent to Robjohns, issued Dec. 20, 1966, as U.S. Pat. No. 3,293,174.

Improved filter systems such as that disclosed in the Robjohns patent have offered certain advantages such as higher surface area in the filter medium but nonetheless are limited in throughput. For example, organic polymer filter media are susceptible of flow shock whereby excessive volumes of liquid to be treated tend to dislodge or otherwise render ineffective the biological film that has attached itself to the filter media surfaces. In addition, the organic polymeric filter media dry rapidly during periods of non-use which can result in loss of effectiveness of the biological film.

Filter media used in sewage treatment facilities, trickle filters and the like should meet a number of requirements for satisfactory operation. For example, the medium should be biologically inert, i.e., neither attached by nor inhibiting the growth of the biological organisms which affect the treatment of sewage, reduction of BOD and the like. In addition, the surface of the medium should offer the biological film a good mechanical and environmental footing as previously mentioned. The structural configuration of the medium employed should be such as to promote the uniform spread of liquid to all parts of the available surface of the medium and also should provide for flow of liquid thereover in as thin a film as possible in order to allow gas exchange required for biological growth.

In addition to the foregoing, the filter media or substrate should provide adequate void space to permit a steady supply of air or other gas to be circulated to the biological growth. For sewage application, the void must also allow free passage of the treated effluent downward.

The filter media serving as a substrate should be chemically stable and should not degrade with age. Important to filtration media used in treating industrial effluent is the characteristic of remaining stable in the presence of small quantities of solvents, acids or organic chemicals. The filter medium should also hold the dissolved and suspended organic matter for as long as possible to allow the biological organisms time to act on the more refractory portions of the matter.

Finally, the filter media should be mechanically stable for purposes of supporting its own weight plus considerable added weight of the effluent and biological growth. At the same time, the media should be hydrophilic to promote wetting of the total surface by liquid and should retain the liquid to avoid drying during intermittent flow.

The present invention provides process and substrates to fulfill the foregoing requirements and to obtain the ends and advantages concomitant therewith.

SUMMARY OF THE INVENTION

The present invention relates to the carrying out of a biochemical reaction by introducing the reactants to the surface of a rigid, porous and adsorbent silica foam substrate. Biochemical reactions subject of the present invention include the treatment of sewage, treatment of liquid effluent such as waste water, and fermentation of carbohydrate liquids. The reactions may be aerobic, anerobic of facultative.

The present invention provides a significant improvement over conventional trickle filter systems by providing substantially higher surface areas for the filtration medium or substrate without increasing volume thereof, and a longer holding time for nutrients on the surface, resulting in marked increase in throughput and conversion. The inorganic foam substrate of the present invention effectively withstands mechanical shock and is much lighter in weight than conventional filter media enabling its use in larger filter assemblies as well as portable systems.

The present invention is an improvement over trickle filters employing organic polymeric materials as substrates as, for example, polyurethane foams, polyvinylchloride, polystyrene, polyethylene and other plastic resins. The inorganic foam of the present invention provides higher surface areas for the substrate than are present in organic foam filters thereby enabling greater throughput. In addition, the inorganic foam substrate of the present invention better withstands temperature shock, volume of flow shock, toxicity shock and drying shock as compared with the organic foam materials. For example, the plastic foams are susceptible to degradation because of adverse temperature conditions as well as decomposition due to solvents, acids and the like frequently present in industrial waste.

The silica foam substrate of the present invention exhibits greater capillary action characteristics as compared with organic foam substrates with the consequent advantage that substrates of the present invention do not dry as rapidly during periods of non-use. Similarly, greater capillary action afforded by the substrates of the present invention diminishes susceptibility of the substrate to poisons that may be present in the liquid material since water retained in the substrate dilutes the poison rendering it less harmful.

The pore size of the filter media is critical since carbonate scale is deposited in time, reducing pore size. Therefore, a compromise must be made between maximum surface area, which increases with decreased pore size, and a large enough pore to prevent clogging. The pore size must also be small enough to prevent penetration by filter flies (Psychoda) which can consume biological films on filter media.

It is, therefore, an object of the present invention to provide a process for carrying out a biochemical reaction by introducing reactants such as bacteria or other biological film-forming matter together with waste or other effluent liquids to the surface of a rigid, porous and adsorbent silica foam substrate.

Yet a further object of the present invention is the provision of a process for carrying out a biochemical oxidation-reduction reaction by introducing reactants to the surface of a rigid, porous adsorbent inorganic silica foam substrate, the silica foam substrate material having been coated with an organic polymer prior to introduction of the reactants thereto.

A still further object of the present invention is the provision of such a process wherein the reactants include at least a fermentable carbohydrate liquid and enzymatic reactant for fermentation purposes.

Another object of the present invention is the provision of a trickle filter including an enclosure having a base member, a bed of rigid and porous inorganic foamed silica mounted on the base member and means for introducing a liquid into the enclosure for contact with the bed as well as means for introducing air or oxygen to the enclosure to circulate through the bed.

Still another object of the present invention is the provision of a method of preparing a substrate for biochemical reactions that includes the steps of foaming and gelling a siliceous material, curing the material, imparting porosity to the cured material and coating the porous material with an organic polymer.

Other and further objects, features and advantages will be apparent in the following description of preferred embodiments of the invention given for the purpose of disclosure.

DESCRIPTION OF THE PREFERRED EMBODIMENTS

One embodiment of the present invention is the provision of a trickle filter employing a rigid, porous, adsorbent inorganic silica foam substrate. The trickle filter may be of conventional design structurally except that the filter media bed or substrate is prepared from an inorganic foamed material. Consequently, the trickle filter of the present invention includes a suitable vessel forming an enclosure and having a floor or base member. A bed of the rigid and porous inorganic foamed material is mounted on the base member. The foamed material may take the form of randomly dispersed pieces of foam of varying size or, in a preferred embodiment, may take the form of pieces of rectangular shape, stacked in spaced relation wherein the rows are alternately positioned at right angles one to the other. Thus provided is a cross-hatched type of filter bed suitably adapted to receive the liquid to be treated and arranged such that air or other oxygen-containing gas may be passed or circulated therethrough.

The vessel or enclosure is provided with means for introducing the liquid such as a pipe and spray head communicating with the enclosure in order that the waste water or other liquid material to be treated may be passed into contact with the filter media or substrate. Any suitable means for introducing oxygen to the enclosure may be provided as will be understood by those skilled in the art.

The rigid, porous, adsorbent inorganic foamed substrate of the present invention preferably is an amorphous siliceous foam although other foamed inorganic materials such as sulfates or mixtures of sulfate and silica may be used. The substrate formed of the inorganic foam material must be porous and rigid in order that biochemical reactions may be carried out in a gas/liquid/solid interface adjacent the surface of the inorganic foam substrate.

The preferred inorganic foam substrate of the present invention is a silica foam manufactured by the method disclosed in U.S. Pat. Nos. 1,944,008 and 1,944,007 assigned to Battelle Memorial Institute by Floyd B. Hobart for a "Heat Insulating Material and Method for Making Same" and a "Light Weight Ceramic Material and Method for Making Same", respectively, followed by washing with hot water to remove water soluble materials from the pores of the silica.

Another silica foam useful in the present invention is manufactured by Fiberglas Canada Limited. The nature of the foam and process for manufacture therefor are disclosed in a pending United States Patent application assigned to Fiberglas Canada Limited and bearing Ser. No. 206,438 filed Dec. 9, 1971 by R. P. Rao for a "Process for Producing Low Thermal Conductivity, High Strength Silica Foam". Generally speaking, the foam is prepared from alkali metal silicate such as sodium silicate or potassium silicate wherein the alkali metal to silicate ratio is high enough for solubility purposes. A suitable gelling agent is added to the silicate to gradually increase polymerization of silicate to effect gellation. The material is foamed such as by use of a high shear impeller device in mechanical whipping action or by forcing compressed air or other gas into the body of liquid. Small amounts of foaming agents greatly enhance foaming action. These agents must be soluble in the material and compatible. Saponin, Rosin soap and soap bark are normally used. The gelling agent may be added either during foaming or afterwards, following which the foam is cured. Curing of the foam to rigid mass is a function of time, temperature and pH. Temperature and pH change must be gradual to avoid fracture or crystallization into particles. Control of pH change may be effected by use of a gelling agent of limited solubility or by use of a gelling agent which is of a different phase, either gas or liquid. Boric acid and carbon dioxide gas may be used. Upon curing, the resulting silica foam is etched or leached to impart porosity thereto. The etching or leaching process may be carried out by contacting the foam with hot water. Small amounts of strong acids such as hydrochloric or sulfuric may be used or larger amounts of weak Lewis Acids may be used to accelerate leaching. The porous form is then dried resulting in a rigid porous material.

In typical applications such as a biofilter or trickle filter, the rigid silica foam blocks or pieces of desired shape are preferably firmly bonded to a plastic bottom or base in the enclosure vessel of the filter such as by means of a suitable adhesive to form a strong, chemically-resistant base.

Then the form blocks are stacked in layers one on the other as previously described. Because of the lightweight, low density characteristics of the silica foam, beds of 10 feet or more may be prepared without the necessity of intermediate supports. When intermediate supports are necessary, simple plastic beams suitably spaced may be used for supporting tall slacks of the filter media. Thus, it now will be recognized that significant weight saving is inherent in the present invention to enable the design of treatment facilities of any height. In addition, it is possible to carry out separate treatment operations in structures of selected lengths or heights with introduction of liquid to be treated and oxygen at selected concentrations and levels.

The silica foam constituting the preferred inorganic substrate of the present invention may be placed in an enclosure and used as a substrate media without further processing. However, according to a still further embodiment of the present invention, the silica foam may be coated with a small amount of organic polymer so as to convert the foam pores or cells into sites almost immediately suitable for bacterial growth. For example, and as will be explained hereafter, if the silica foam is flushed and thereby coated with gelatin or a polymer such as methyl cellulose, polyvinyl pyrolidone, polyvinyl alcohol or polyvinyl acetate, hydrophilic properties of the silica foam are increased enabling the silica foam substrate to be washed with waste water so to be replaced quickly by biological films. If untreated silica foam is placed in a trickle filter, up to 3 weeks may be required before bacteria or biological films develop to the extent that the trickle filter may effectively oxidize the waste liquid. On the other hand, if non-biodegradable or insoluble films are deposited on the foam, the adsorbent properties will be lost so that dissolved and suspended organic wastes will not be held for utilization by biological processes.

Pore size of the silica foam as described above ranges from about 100 to about 800 microns. Pores in this range of size provide a relatively enormous surface area as compared with conventional trickle filters thereby promoting high throughput through the filter and high conversion rates from the standpoint of oxidation of organic materials contained in the material to be treated. They are also too small for Psychoda fly larva to penetrate.

The silica foam material produced according to the Fiberglas Canada Ltd. method described above contains cells or openings formed by gas or air bubbles during the manufacturing process. These cells are linked by the pores imparted during etching or leaching as previously described, and it is preferred that at least about 90% of the cells be open (i.e., interconnected by pores) thereby providing pathways for the flow of water. Said another way, less than about 10% of the cells in the silica foam should be closed. The degree to which cells are open may be determined by conventional techniques such as election micrography, gas diffusion and absorption studies, buoyancy studies and the like as will be readily understood by those skilled in the art.

EXAMPLE 1

A trickle filter was prepared having a packed bed comprised of silica foam blocks of the type previously described with respect to Fiberglas Canada Ltd. with pore sizes in the range mentioned above. Dimensions of the silica foam blocks were 2 inches by 10 inches, weighing 4 to 5 pounds per cubic foot. Prior to use, the silica foam material was coated with polyvinyl alcohol to enhance hydrophilic character of the foam and withstand washing by waste water long enough to be replaced by biologically produced polymers as previously explained. The polyvinyl alcohol solution was 2% by weight polyvinyl alcohol in 98% water, the foam blocks having been flushed with the solution and allowed to drain and dry in the air.

The treated silica foam blocks were placed on rock filter media in a conventional trickle filter and waste water was trickled over the bed. One week later, the silica foam was noticeably greener with algae than the conventional rock filter media. Part of the foam was cut in two and examined microscopically evidencing filamentous and gelatinous growth. One year later, the silica foam blocks in the trickle filter were still obviously greener with algae than the surrounding conventional rock filter media when viewed from a distance of several feet. Microscopic examination of the interior of one silica foam block exhibited slightly more filamentous and gelatinous mass than the one-week sample, although water flowed readily through the silica foam material.

EXAMPLE 2

To demonstrate effectiveness of the silica foam as a substrate for treating industrial waste, a biological treatment column was prepared by stacking silica foam blocks of the nature explained in Example 1 in a vessel. Dimensions of the blocks were 2 inches by 18 inches by eighteen inches, the blocks being stacked in rows, each row being stacked at right angles with respect to the next row. The approximate volume of foam used was 50 cubic feet which occupied a filter volume of 100 cubic feet. The silica foam material was treated with an organic polymer prior to use in a manner similar to that explained in Example 1 except that the polymer was methyl cellulose (sold under the trade name "Methocel 65HG" by Dow Chemical Co.). Industrial waste water was circulated and recirculated through the filter at an average flow of 390 gallons per cubic foot per day. After the filter had been in operation only 3 days, average reduction of BOD was 29% in one pass. Average reduction of cyanide in the 0.1 to 4 parts per million range was 90%. Phenol reduction was 48%.

EXAMPLE 3

Two biological treatment columns were prepared by stacking blocks of silica foam blocks with dimensions of 2 inches by 18 inches by 18 inches in filter vessels, the silica foam being of the nature described in Example 1. The volume of foam in each column was 100 cubic feet occupying a total volume of 200 cubic feet each. The silica foam in one column was not treated with organic polymer while the silica foam in the second column was treated with food grade gelatin in the manner described in Example 1. Industrial waste water was passed through both filters at a rate of 216 gallons per cubic foot of silica foam media per day. In the column having silica foam treated with gelatin, reduction of BOD of the industrial waste water began after only 2 days and average BOD reduction in the first 3 weeks of operation of such filter was 56%. In the column having silica foam untreated with organic polymer, BOD reduction began after 10 days and average BOD reduction in a 3-week period beginning 17 days from inception was 47%.

Comparing the foregoing examples of silica foam trickle filter treatment of industrial waste water with conventional high rate trickle filters, conventional high rate trickle filters are capable of reducing BOD 50 to 70% at a flow rate of 15 gallons per cubic foot per day. In contrast, the use of silica foam filters (even without organic polymer coating) reduced BOD from about 25 to nearly 60% at flow rates of 15 to 20 times of that of conventional filters. Consequently, the use of inorganic foam substrate-type trickle filters is nearly 10 times more effective than conventional biological filters.

EXAMPLE 4

To illustrate effectiveness of silica foam as a filter media for use under anerobic conditions, a biological treatment column was prepared by stacking silica foam blocks having dimensions of 2 inches by 18 inches by 18 inches and 4 to 5 pounds per cubic foot density in an arrangement whereby the blocks were stacked in rows, one row being at right angles relative to the next. The blocks were placed as close as possible to one another in an effort to leave no spacing between blocks. Prior to use, the silica foam material was treated with polyvinyl pyrolidone (sold under the trade name "PVP 50" by GAF corp.) in a manner similar to that explained in Example 1.

Industrial waste water was recirculated through the filter at an average flow of 200 gallons per cubic foot of silica foam per day, the recirculated waste water containing less than 0.01 milligrams per liter of sulfide. After three weeks of operation, cores were taken from the filter bed by driving a 1-inch pipe through the foam filter. Core samples of individual blocks were crushed to expel water and the water analyzed for sulfide. Sulfide was found in concentrations up to 0.8 milligrams per liter indicating that anerobic reduction of sulfates to sulfides had occurred.

EXAMPLE 5

To illustrate that other types of rigid, porous inorganic foam substrates may be used, a rigid foam was prepared by whipping a conventional Portland cement slurry in a blender with 1% by weight of ethyloxylated amine (purchased under the trade name "Ethomeen C-25" manufactured by ARMAK Chemical Co.), folding in 10% by weight fine-ground silica and then folding in 10% by weight of calcium sulfate slurry. After aging, the rigid closed cell foam was etched in 10% hydrochloric acid by repeated immersions in the acid for several minutes until drainage through the foam was achieved indicating pores had been imparted to the foam material. The foam was then rinsed in water and allowed to dry for several days. The dry foam was coated with polyvinyl alcohol solution as described in Example 1 and placed in a conventional sewage trickle filter. In operation, algae covered the foam in a few days and one month later the foam was obviously greener with algae than surrounding conventional filter rocks.

EXAMPLE 6

To illustrate that silica foam according to the present invention may be used in a biological filter for fermentation purposes, pieces of silica foam of the nature described in Example 1 but untreated with organic polymer were placed in and filled a polyvinylchloride pipe 4 inches in diameter and 30 feet long. A solution of 3% dried brewer's yeast in water was passed through the column after which a 20% by weight solution of manose containing 0.1 weight percent urea and 0.1 weight percent dipotassium phosphate was passed through the column at a rate of 6 gallons per hour. After 6 hours, the presence of ethyl alcohol in the effluent in approximately 2 weight percent concentration was confirmed by gas chromotograph and then infra-red spectrophotometric analysis.

EXAMPLE 7

The system of Example 6 was modified by adding holes to the polyvinyl chloride pie for aeration purposes. Upon further circulation of the reactants described in Example 6, acetic acid formed indicating that oxidation had occurred.

While the foregoing examples have illustrated, among other things, the effectivensss of coating silica foam with certain organic polymers with the described benefits, it will be appreciated by those skilled in the art that other organic polymer materials may be used. The organic polymer selected should be capable of swelling and becoming viscous in contact with water. While strength of the organic polymer is not critical, the organic polymer solution used to coat the silica foam should not be so viscous as to clog the silica foam pores. Consequently, coating solutions containing about 0.5 to about 5% of organic polymer are preferred although higher concentrations may be used. The preferred organic polymer for coating silica foam according to the present invention is polyvinyl alcohol because of its characteristics of adhering to the silica foam surfaces even in dilute solutions. Polyvinyl alcohol manufactured by E. I. du Pont de Nemours & Co. and sold under the trade name "Elvanol 5 - 42" is satisfactory.

Nutrients may be added to the organic polymer material used to coat the silica foam to enhance or modify as desired the biological activity of the filter media. For example, ammonium nitrate and/or tripotassium phosphate may be added to the organic polymer solution in desired amounts. Applicant has discovered that a suitable nutrientorganic polymer coating solution may contain 2% polymer, 0.1% ammonium nitrate, 0.2% tripotassium phosphate, and 97.7% water (expressed in weight percentages). Of course, these proportions may be varied and other nutrients may be used as will be appreciated by those skilled in the art.

The present invention, therefore, is well adapted to carry out the objects and attain the ends and advantages mentioned as well as others inherent therein. Many uses and adaptations, substitutions, equivalents and rearrangements of the present invention will occur to those skilled in the art which are encompassed in the invention as defined by the scope of the appended claims.

What is claimed is:

1. A process for reducing the BOD of a waste water stream comprising introducing the stream to a bed of shaped, porous and adsorbent silica substrate, the silica substrate having been formed by gelling and subsequent leaching of a soluble alkali metal silicate selected from the group consisting of sodium and potassium silicates to provide a porous, insoluble silica, the pores of which are of sizes from about 100 to about 800 microns.

2. The process of claim 1 wherein the stream introduced to the bed of silica substrate undergoes a reaction which is one of aerobic, anerobic or facultative reactions.

3. The process of claim 1 wherein the stream introduced to the silica substrate undergoes a biochemical oxidation-reduction reaction.

4. A process for reducing the BOD of a waste water stream comprising,
   a. passing the stream downwardly through a bed of shaped and adsorbent silica substrate, the silica substrate having been formed by gelling and subsequent leaching of a soluble alkali metal silicate selected from the group consisting of sodium and potassium silicates to provide a porous, insoluble silica, the pores of which are of sizes from about 100 to about 800 microns, and
   b. introducing oxygen to said bed whereby the organic content of the stream being treated is biologically oxidized.

* * * * *